United States Patent [19]

Favre

[11] Patent Number: 4,806,375

[45] Date of Patent: Feb. 21, 1989

[54] METHOD FOR THE EXTRACTION OF SEALED CARTRIDGES FOR THE PREPARATION OF BEVERAGES

[75] Inventor: Eric Favre, Saint-Barthelemy, Switzerland

[73] Assignee: Nestec S.A., Vevey, Switzerland

[21] Appl. No.: 52,604

[22] Filed: May 19, 1987

[30] Foreign Application Priority Data

Jun. 27, 1986 [CH] Switzerland .................. 2607/86

[51] Int. Cl.$^4$ .............................................. A23F 5/26
[52] U.S. Cl. ........................................ 426/433; 99/295; 99/302 R
[58] Field of Search ............. 99/295, 299, 300, 302 R; 426/433

[56] References Cited

U.S. PATENT DOCUMENTS

| | | | |
|---|---|---|---|
| 2,899,886 | 8/1959 | Rodth | 99/295 |
| 2,952,202 | 9/1960 | Renner et al. | 99/295 X |
| 2,968,560 | 1/1961 | Goros | 99/295 |
| 3,083,101 | 3/1963 | Noury | 99/295 |
| 3,088,826 | 5/1963 | Renner et al. | 426/433 X |
| 3,607,297 | 9/1971 | Fasano | 99/295 X |
| 4,136,202 | 1/1979 | Faure | 99/295 X |
| 4,581,239 | 4/1986 | Woolman et al. | 426/433 |

FOREIGN PATENT DOCUMENTS 605293 12/1976 Switzerland .
2123685 1/1983 United Kingdom .

OTHER PUBLICATIONS

International Application published under PCT, WO 8605670, published 3-28-86, Boumani et al. (99-295), all pages relied upon.

Primary Examiner—Joseph Golian
Attorney, Agent, or Firm—Vogt & O'Donnell

[57] ABSTRACT

A process for extracting aromatic substances which are contained in sealed cartridges by injecting water for prewetting the substance in the cartridge, injecting air into the prewetted substance and injecting water for extraction of the substance. More particularly, the aromatic substances which are extracted are for the preparation of a beverage and are contained in cartridges which have a top portion capable of being pierced by an injector and a base portion having a membrane provided with a line of weakness which breaks during the extraction process with a filter being provided between the membrane and the substance to be extracted. The prewetting water is injected into the substance in the cartridge at a pressure of between 2 kg/cm$^2$ and 3 kg/cm$^2$. Air is injected at a pressure of between 3 kg/cm$^2$ and 6 kg/cm$^2$ for opening up irrigation channel pathways in the prewetted substance and for applying a force to the cartridge membrane greater than the breaking resistance of the line of weakness for tearing the membrane along the line of weakness. Water is injected into the substance in the cartridge at a pressure of between 8 kg/cm$^2$ and 16 kg/cm$^2$ for extraction.

2 Claims, No Drawings

METHOD FOR THE EXTRACTION OF SEALED CARTRIDGES FOR THE PREPARATION OF BEVERAGES

BACKGROUND OF THE INVENTION

This invention relates to a method for extracting sealed cartridges containing roasted and ground coffee or any other aromatic substance for the preparation of beverages.

The GB-patent No. 2 123 685 concerns a method for producing a beverage from an infusible material such as coffee or tea in a sachet with filtering part. This sachet being not sealed, there is no increasing pressure by the wetting, the aeration and the extraction.

SUMMARY OF THE INVENTION

To prepare good espresso coffee from sealed cartridges containing the correct amount of roasted and ground coffee for a cup of coffee, certain conditions have to be satisfied during extraction of the cartridges. In the context of the invention, cartridges are understood in particular to be the cartridges according to CH-PS No. 605293. The cartridges disclosed and described in CH-PS No. 605293 have a sealed body which includes a top portion capable of being pierced by an injector and a base portion which includes a membrane which closes and seals the base. A filter member is positioned within the cartridge adjacent the membrane and separates the membrane and the substance to be extracted. As disclosed and described, the membrane is provided with a line of weakness. Under pressure during extraction, the membrane expands and finally breaks along the line of weakness thereby forming an aperture through which a beverage extracted from the substance may flow from the cartridge.

The method according to the invention specifies the particular conditions which have to be observed to obtain effective extraction of the cartridge.

The present invention relates to a method for the extraction of sealed cartridges which comprises the following steps:

(a) a quantity of prewetting water is introduced into the cartridge from above at a pressure comprised between 2 and 3 $kg/cm^2$;

(b) air is injected to aerate the ground coffee or aromatic substance at a pressure comprised between 3 and 6 $kg/cm^2$; and (c) water is introduced for the actual extraction of the cartridge at a pressure comprised between 8 and 16 $kg/cm^2$ and the beverage is recovered from the cartridge from below.

Where ground coffee is used, espresso coffee may be prepared in accordance with the invention.

DETAILED DESCRIPTION OF THE INVENTION

In the context of the invention, an aromatic substance may be any substance capable of being extracted, namely roasted and ground coffee, tea and other similar substances, such as aromatic plants, including, vervain, camomille, fennel and others.

The cartridge used is pierced from above for introduction of the prewetting and extraction water and the air used for aeration. In its lower part, it comprises a filter and a membrane incorporating a weakening line which opens during the aeration phase, thus enabling the espresso coffee or the prepared beverage to flow out.

In the prewetting phase, the water enters the cartridge and swells the coffee. This water spreads slowly throughout the loosely packed ground coffee, its flow being arrested by the membrane which is still intact. Each grain of ground coffee expands without any restriction and increases freely in volume. The ground coffee is thus uniformly moistened and, in addition, all the volatile aromas are picked up by the prewetting water before the membrane opens. The duration of the prewetting phase is from 2 to 4 seconds.

The aeration phase is essential for obtaining good espresso coffee.

The correctly moistened ground coffee occupies the entire volume available and offers a resistance to the passage of the air. Since the coefficient of friction of air is infinitely lower than that of water, the air passes quickly through the ground coffee and, above all, diffuses uniformly throughout the volume. The pathways opened up by the air are so many small irrigation channels for the extraction water. The volume of air under pressure from the extraction water is compressed in the cartridge and infiltrates all the interstices left free by grinding and even enters certain voids in the surface of the grains of ground coffee. When the pressure of the air applies to the cartridge membrane a force greater than its breaking resistance, it tears along the weakening line and part of the air volume expands suddenly to the outside, momentarily producing a reduction in pressure in the cartridge. Thus, in accordance with the invention, the membrane line of weakness has a strenth sufficient to withstand a pressure without breaking during injection of the prewetting water. The membrane line of weakness has a strength sufficient such that it does not break when the prewetting water is injected into the substance in the cartridge at a pressure of between 2 $kg/cm^2$ and 3 $kg/cm^2$, but does break at a point in time after air is injected into the substance in the cartridge at a pressure of between 3 $kg/cm^2$ and 6 $kg/cm^2$ for forming the irrigation channel pathways and for applying a force to the cartridge membrane greater than the breaking resistance of the line of weakness. The aeration phase lasts for approximately one second. The aeration phase is also useful for increasing the extraction of the aromatic oils of the coffee and by the passage through the filter of the cartridge the air gives an emulsion of the oils in the water.

In the final phase, the extraction water passes through the irrigation channels under initially only a low pressure. Subsequently, the forces of friction of the water on the particles compress the coffee and the extraction pressure increases exponentially. This pressure stops increasing when the compression forces are balanced by the expansion forces of the irrigation channels produced by the expansion of the air entrained by the water. Thus, extraction continues at a constant pressure and the water extracts all the coffee grains under optimal conditions. The duration of this final phase is less than 20 seconds. The espresso coffee thus obtained has a creamy, golden froth by virtue of the air-coffee mixture and the fraction of air dissolved in the coffee.

According to the invention, the prewetting and aeration steps may take place either concomitantly or alternately. The same also applies to the aeration and extraction steps.

The method according to the invention thus gives a high-quality espresso coffee in a reduced extraction time with all the aromas produced by roasting remaining intact through prewetting in a sealed cartridge and with a considerable volume of air trapped in the coffee.

I claim:

1. A process for obtaining extracts from roast and ground coffee contained in sealed cartridges which have a body which includes a top portion capable of being pierced by an injector and a base portion having a membrane provided with a line of weakness a filter member within the cartridge adjacent the membrane which separates the membrane and the coffee to be extracted, comprising piercing the cartridge top portion with an injector, injecting water into the coffee in the cartridge via the injector at a pressure of between 2 $kg/cm^2$ and 3 $kg/cm^2$ for from 2 seconds to 4 seconds, for prewetting the coffee so that it occupies the entire volume available and for providing resistance to passage of air through the coffee, injecting air into the prewetted coffee at a pressure of between 3 $kg/cm^2$ and 6 $kg/cm^2$ for approximately 1 second, for opening up irrigation channel pathways in the prewetted coffee and for applying a force to the cartridge membrane greater than the breaking resistance of the line of weakness for tearing the membrane along the line of weakness, and injecting water into the coffee in the cartridge via the injector at a pressure of between 8 $kg/cm^2$ and 16 $kg/cm^2$ for less than 20 seconds for extracting the substance.

2. A method according to claim 1 wherein the coffee is espresso coffee.

* * * * *

UNITED STATES PATENT AND TRADEMARK OFFICE
CERTIFICATE OF CORRECTION

PATENT NO. : 4,806,375

DATED : February 21, 1989

INVENTOR(S) : Eric FAVRE

It is certified that error appears in the above-identified patent and that said Letters Patent is hereby corrected as shown below:

On the Title Page, under the heading "U.S. Patent Documents", "Faure" should be --Favre--.

Column 3, line 9, insert --and-- after weakness.

Signed and Sealed this

Twelfth Day of September, 1989

Attest:

DONALD J. QUIGG

Attesting Officer

Commissioner of Patents and Trademarks